US 8,781,681 B2

(12) United States Patent
Parison, Jr. et al.

(10) Patent No.: US 8,781,681 B2
(45) Date of Patent: Jul. 15, 2014

(54) ACTIVE SUSPENDING

(71) Applicants: James A. Parison, Jr., New Ipswich, NH (US); Upendra V. Ummethala, Cupertino, CA (US)

(72) Inventors: James A. Parison, Jr., New Ipswich, NH (US); Upendra V. Ummethala, Cupertino, CA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 13/972,496

(22) Filed: Aug. 21, 2013

(65) Prior Publication Data
US 2013/0334394 A1 Dec. 19, 2013

Related U.S. Application Data

(60) Continuation of application No. 12/874,264, filed on Sep. 2, 2010, now Pat. No. 8,548,678, which is a division of application No. 10/978,105, filed on Oct. 29, 2004, now Pat. No. 7,983,813, and a division of application No. 11/418,345, filed on May 3, 2006, now Pat. No. 8,095,268, which is a continuation-in-part of application No. 10/978,105, filed on Oct. 29, 2004, now Pat. No. 7,983,813.

(51) Int. Cl.
*F16M 13/00* (2006.01)
*B60N 2/50* (2006.01)

(52) U.S. Cl.
CPC ............................. *B60N 2/501* (2013.01)
USPC .................. 701/37; 701/36; 701/38; 701/40; 280/5.5; 280/5.515

(58) Field of Classification Search
USPC .......... 701/36, 37, 38, 49, 70; 280/5.5, 5.507, 280/5.508, 5.512–5.515; 267/136; 73/570, 73/579
See application file for complete search history.

(56) References Cited

U.S. PATENT DOCUMENTS

| 4,728,873 | A |   | 3/1988  | Inoue et al. |
|-----------|---|---|---------|--------------|
| 4,913,482 | A |   | 4/1990  | Hanai et al. |
| 5,004,967 | A |   | 4/1991  | Ogasawara    |
| 5,060,959 | A | * | 10/1991 | Davis et al. ................ 280/5.514 |
| 5,144,559 | A | * | 9/1992  | Kamimura et al. ............. 701/37 |
| 5,313,399 | A | * | 5/1994  | Beale ............................ 701/124 |

(Continued)

FOREIGN PATENT DOCUMENTS

| CN | 2465980 Y | 12/2001 |
| EP | 0232647   | 8/1987  |

(Continued)

OTHER PUBLICATIONS

First Chinese Office Action dated Mar. 12, 2012 for CN Application No. 200880125303.9.

(Continued)

*Primary Examiner* — Thomas Black
*Assistant Examiner* — Wae Louie

(57) ABSTRACT

In an active suspension system for actively suspending a plant, a fail-safe system controlled by a failure-detector has a selectively-activated damper coupled to the plant. The damper may be a separate element from the actuator. Under normal circumstances, the damper is deactivated and therefore generates no damping force. However, if the failure detector detects an abnormal state in the system, it activates the damper, thereby causing a damping force that resists motion of the plant.

13 Claims, 14 Drawing Sheets

(56) References Cited

U.S. PATENT DOCUMENTS

| | | | |
|---|---|---|---|
| 5,358,305 A | 10/1994 | Kaneko et al. | |
| 5,451,094 A | 9/1995 | Templin et al. | |
| 5,582,385 A * | 12/1996 | Boyle et al. | 248/550 |
| 5,652,704 A | 7/1997 | Catanzarite | |
| 5,876,085 A | 3/1999 | Hill | |
| 6,014,602 A | 1/2000 | Kithil et al. | |
| 6,059,253 A * | 5/2000 | Koutsky et al. | 248/550 |
| 6,070,681 A * | 6/2000 | Catanzarite et al. | 180/89.15 |
| 6,082,715 A | 7/2000 | Vandermolen | |
| 6,120,082 A | 9/2000 | Vandermolen | |
| 6,193,297 B1 | 2/2001 | Vandermolen | |
| 6,212,455 B1 | 4/2001 | Weaver | |
| 6,213,567 B1 | 4/2001 | Zittlau et al. | |
| 6,264,163 B1 * | 7/2001 | Ivarsson | 248/588 |
| 6,286,819 B1 * | 9/2001 | Ritchie et al. | 267/64.12 |
| 6,312,015 B1 | 11/2001 | Merrick et al. | |
| 6,322,140 B1 | 11/2001 | Jessup et al. | |
| 6,328,379 B1 | 12/2001 | Merrick et al. | |
| 6,382,718 B1 | 5/2002 | Janke et al. | |
| 6,420,996 B1 * | 7/2002 | Stopczynski et al. | 342/70 |
| 6,582,015 B2 | 6/2003 | Jessup et al. | |
| 6,585,240 B1 | 7/2003 | Fujita et al. | |
| 6,600,985 B2 | 7/2003 | Weaver et al. | |
| 6,637,816 B2 * | 10/2003 | Pavlov et al. | 297/216.2 |
| 6,644,590 B2 * | 11/2003 | Terpay et al. | 244/17.27 |
| 6,719,258 B2 * | 4/2004 | Bryngelson et al. | 248/419 |
| 6,886,650 B2 * | 5/2005 | Bremner | 180/89.13 |
| 6,942,202 B2 * | 9/2005 | Kienholz | 267/140.14 |
| 7,039,512 B2 * | 5/2006 | Swinbanks et al. | 701/37 |
| 7,068,178 B2 * | 6/2006 | Oh | 340/667 |
| 7,229,133 B2 * | 6/2007 | Maddelein et al. | 297/362.13 |
| 7,234,575 B2 * | 6/2007 | Anderfaas et al. | 188/267.2 |
| 7,983,813 B2 * | 7/2011 | Ummethala et al. | 701/37 |
| 8,095,268 B2 * | 1/2012 | Parison et al. | 701/37 |
| 2005/0278094 A1 * | 12/2005 | Swinbanks et al. | 701/37 |
| 2006/0095180 A1 * | 5/2006 | Ummethala et al. | 701/37 |
| 2006/0200287 A1 * | 9/2006 | Parison et al. | 701/37 |
| 2006/0237885 A1 * | 10/2006 | Paillard et al. | 267/140.15 |
| 2006/0261647 A1 * | 11/2006 | Maas et al. | 297/216.1 |
| 2008/0051958 A1 * | 2/2008 | Pelchen et al. | 701/37 |
| 2010/0320357 A1 * | 12/2010 | Ummethala et al. | 248/550 |

FOREIGN PATENT DOCUMENTS

| | | |
|---|---|---|
| EP | 1362748 A2 | 11/2003 |
| MX | 9503384 A | 2/1997 |
| WO | 9421487 A1 | 9/1994 |
| WO | 0183261 A1 | 11/2001 |
| WO | 2005102112 A2 | 11/2005 |

OTHER PUBLICATIONS

Fourth Chinese Office Action dated Apr. 17, 2013 for CN Application No. 200880125303.9.

International Preliminary Report on Patentability dated Aug. 19, 2010 for PCT/US2008/084533.

International Search Report and Written Opinion dated Mar. 26, 2009 for PCT/US2008/084533.

RollTek—IMMI, http://www.imminet.com/products/rolltek/; retrieved from the Internet Nov. 21, 2013.

Second Chinese Office Action dated Aug. 27, 2012 for Application No. 200880125303.9.

Third Chinese Office Action dated Dec. 28, 2012 for CN Application No. 200880125303.9.

* cited by examiner

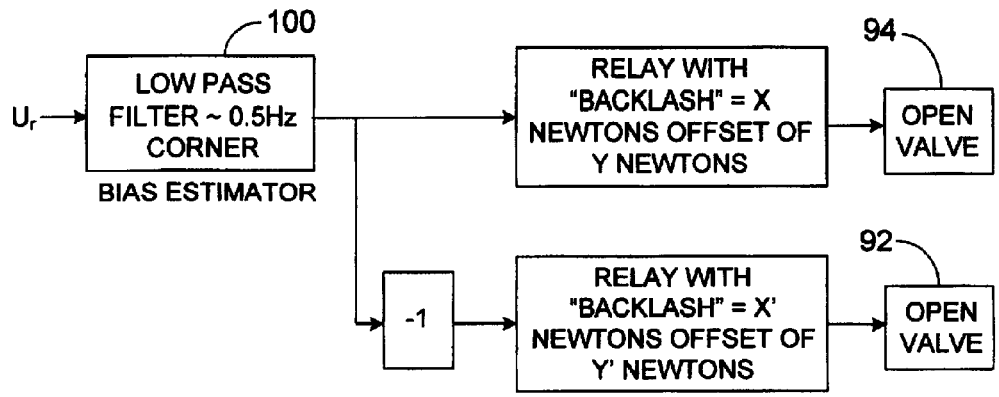
FIG. 15
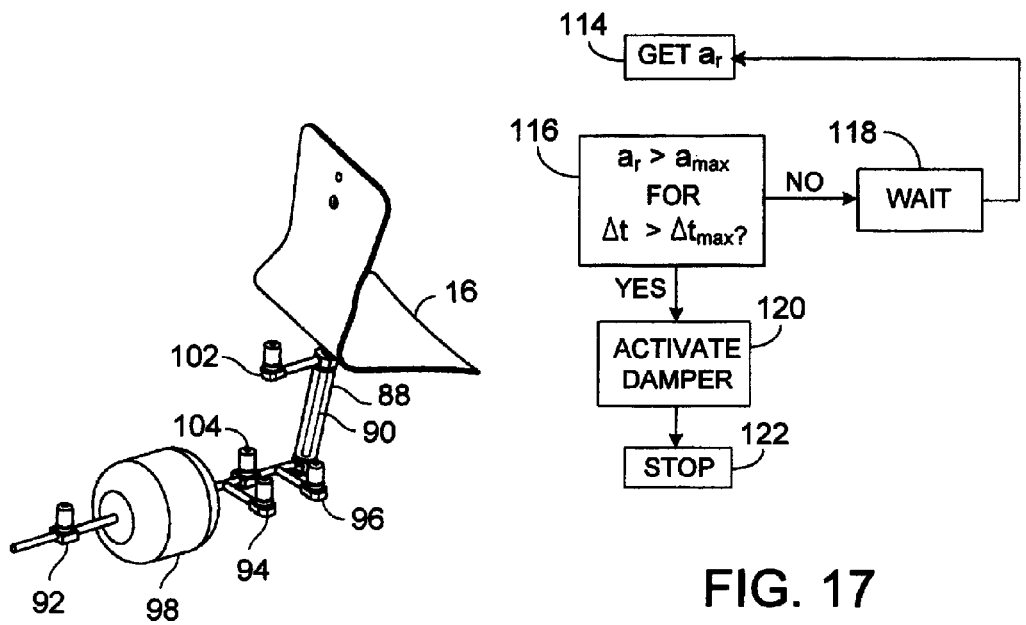
FIG. 17
FIG. 14

ACTIVE SUSPENDING

This application is a continuation of and claims the priority benefit of earlier-filed application Ser. No. 10/978,105, filed on Oct. 29, 2004, entitled ACTIVE SUSPENDING; and application Ser. No. 11/418,345, filed on May 3, 2006, entitled ACTIVE SUSPENDING, and application Ser. No. 12/874,264, filed Sep. 2, 2010 entitled ACTIVE SUSPENDING, the entire disclosures of which are hereby incorporated by reference.

FIELD OF INVENTION

This description relates to active suspending.

BACKGROUND

A vehicle moving in a desired direction inevitably experiences motion in other directions as well. This undesired motion often arises from disturbances in the medium through which the vehicle travels. For example, whether one travels by land, sea, or air, one might encounter bumps, waves, air pockets, and the like.

At best, such random acceleration causes discomfort and annoyance to those in the vehicle. For certain susceptible individuals, these random accelerations can trigger a bout of motion sickness. However, in some cases, a particularly violent acceleration will cause the operator to briefly lose control of the vehicle.

Even when stationary, there is some residual vibration associated with the vehicle's engine. In motion, even on smooth roads, this residual vibration can become oppressively tiresome.

SUMMARY

According to the present invention there is provided an apparatus comprising: an electromagnetic actuator coupled to the plant; a sensor for providing information indicative of a state of the plant, a controller for receiving the information indicative of the state of the plant and outputting a signal to the electromagnetic actuator to cause the electromagnetic actuator to exert a force on the suspended plant, the controller provided with a fail-safe system controlled by a failure detector, and a selectively actuated damper separate from the electromagnetic actuator and coupled to the plant, wherein, under normal circumstances the damper is deactivated and generates little or no damping force, and when the failure detector determines that the plant is in an abnormal state, the fail safe system is caused to actuate the selectively actuated damper such that the selectively actuated damper provides a damping force that resists motion of the plant.

Implementations may include one of the following features, or any combination thereof. The abnormal state is indicated by a sensor signal that is larger than a predetermined threshold. The sensor is an accelerometer and the predetermined threshold is a predetermined acceleration threshold. The abnormal state is indicated by a failure of the sensor to provide information indicative of the state of the plant. The abnormal state is indicated by an inconsistency between the sensor output and the physical constraints of the plant.

In another aspect, an apparatus for controlling an actively suspended plant comprises: an active suspension system comprising: an electromagnetic actuator coupled to the plant; a power amplifier for providing current to the electromagnetic actuator; a power supply; a sensor for providing information indicative of a state of the plant, an apparatus for providing information indicative of a state of a component of the active suspension system, a controller for receiving the information indicative of the state of the plant and outputting a signal to the power amplifier to provide a current to the electromagnetic actuator to cause the electromagnetic actuator to exert a force on the suspended plant, the controller provided with a fail-safe system controlled by a failure detector, and a selectively actuated damper separate from the electromagnetic actuator and coupled to the plant, wherein when the failure detector determines that either the plant is in an abnormal state or a component of the active suspension system is in an abnormal state, the fail safe system is caused to actuate the selectively actuated damper such that the selectively actuated damper provides a damping force that resists motion of the plant.

Implementations may include one of the following features, or any combination thereof. The component of the active suspension system is the sensor. The component of the active suspension system is the power supply. The component of the active suspension system is the power amplifier. The component of the active suspension system is the electromagnetic actuator. The component of the active suspension system is the controller. The active suspension further comprises a force bias eliminator having the characteristic of a spring with variable spring constant. The component of the active suspension system is the force bias eliminator.

BRIEF DESCRIPTION OF THE FIGURES

Other features and advantages of the invention will be apparent from the following detailed description in which:

FIG. 14 shows an exemplary force bias eliminator;

FIG. 15 is a block diagram showing processing by the force bias eliminator;

FIG. 17 shows an algorithm for a fail-safe system;

DETAILED DESCRIPTION

An actively-suspended plant includes a seat, or other platform, coupled to one or more active suspension elements, each providing active suspension along an axis. In many cases, it is useful, though by no means required, to have a passive suspension element cooperating with an active suspension element along one or more axes. In such cases, the active suspension element can be mounted either in series or in parallel with the passive suspension element.

In the following description, numerous references are made to the position and motion of a plant. It is understood, for facilitating the discussion in the following in light of the disclosed embodiments, that "position" means position of the plant relative to a vehicle and that "motion" means motion of the plant relative to an inertial reference frame. Accordingly, references to position signals refer to signals that carry information about the position of the plant relative to the vehicle. References to motion signals refer to signals that carry information about the motion, such as the acceleration, of the plant relative to the inertial reference frame The following description refers to embodiments in which the plant is intended to translate along any one or more of three coordinate axes in a Cartesian coordinate system. However, the control system does not require any particular coordinate system for its operation. For example, the plant can be configured to translate along any one or more of two axes. Additionally the plant can be configured to translate along one or more axes that are non-orthogonal as well as orthogonal.

Neither is the control system described below restricted to the control of plant translation. The control system can also be used to control rotary motion, such as pitch, roll or yaw. Or, the control system can be used to control any combination of rotational and translational motion.

Figure 1:
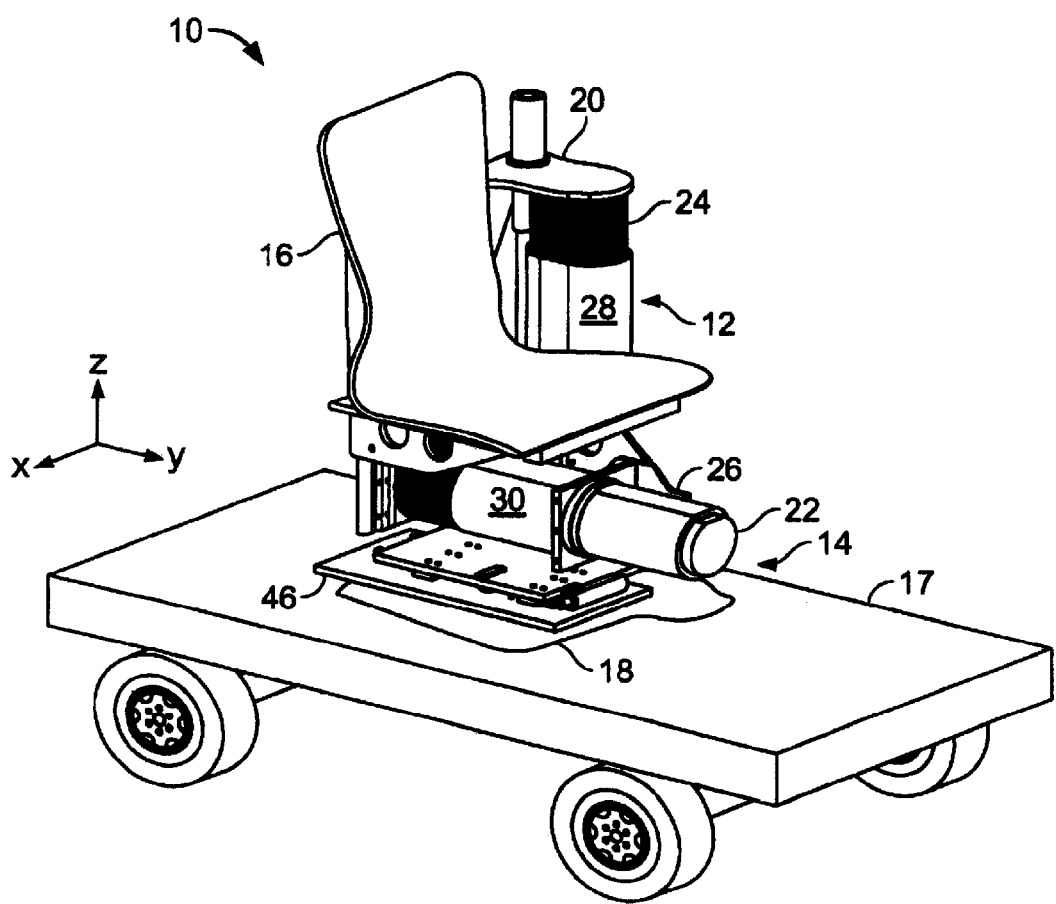
FIG. 1 and FIG. 4-7 show actively-suspended plants.

FIG. 1 shows an actively-suspended plant 10 having a vertical active suspension element 12 for affecting, e.g., suppressing, motion of a plant 16 along a vertical axis, z, and a longitudinal active suspension element 14 for affecting motion of the plant 16 along a longitudinal axis, y. Motion of the plant 16 along a transverse axis, x, is affected by a passive suspension element 18, such as a spring or spring/damper based system. In cases in which the plant 16 includes a seat, as in the case shown in FIG. 1, the inclusion of an active suspension element 14 for suppressing longitudinal motion, as opposed to inclusion of a purely passive suspension, is particularly useful because it permits the seat to remain still when a force is exerted on the external environment. Such a feature is useful, for example, to prevent the seat from moving aft in response to pressing a foot pedal.

As used in this description, an active suspension is a suspension that includes an actuator as an integral part thereof. Such an actuator is capable of generating forces whose magnitude and direction can be controlled independently of the position and motion of the suspension. In some embodiments, the actuator is an electromagnetic actuator, or electromagnetic motor, either linear or rotary, single-phase or multi-phase.

The term "plant" is intended to include the system that receives a control signal and whose position and motion are to be controlled. The plant can include a seat, a passenger, any fixtures associated with the seat, the seat's support structure, power electronics, and mathematical models of active and/or passive suspension elements to the extent that those elements affect the dynamic properties of the system to be controlled.

Actively-suspended plants can be used in a variety of applications. For example, an actively-suspended plant can be an engine mount, a platform on a boat, a seat, bed, or cab used in any moving vehicle such as a car, truck, boat or other watercraft, train, bus, recreational vehicle, ambulance, tractor, truck-trailer, farm machinery, construction machinery, weapons platform, airplane, helicopter or other aircraft, a personal transportation device, such as a wheelchair, or a baby carriage. Other examples of actively-suspended plants include machine tool isolation tables, interferometer benches, photolithography tables, and the like.

The plant need not include a seat at all. It can, for example, be a bed for sleeping, such as those found in truck cabs or in sleeping cars on a train. Moreover, the plant need not carry a human being. For example, there exists cargo that is quite fragile (e.g. china and crystal) or quite explosive (e.g. dynamite), both of which are often transported very carefully. An actively-suspended plant would provide a suitable way to transport such cargo.

Moreover, the plant may cover a significant area. For example, on a luxury cruise ship it may be useful to have a barber shop, or a motion-sickness recovery lounge, that stays stationary even as the ship pitches and rolls. Such plants would enable one to enjoy the benefits of a close shave even during a storm at sea.

Each suspension element, whether active or passive, suppresses motion along at least one axis. In some embodiments, all axes can be provided with active suspension elements, in which case no passive suspension elements are needed. However, other embodiments include those in which: one axis, preferably the vertical axis, is provided with an active suspension; and axes other than the vertical axes are provided with passive suspension elements. Another option is to provide one axis, preferably a transverse axis, with a passive suspension and to provide the axes other than the transverse axes with active suspension. In other embodiments, rotational motion, such as pitch, roll, and yaw are controlled. In such cases, an active suspension can be configured to urge the plant to pitch, roll, yaw, or any combination thereof.

Figure 2:
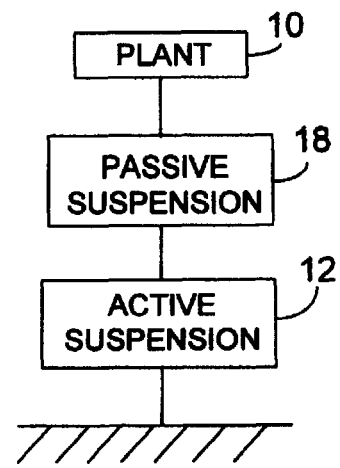
FIGS. 2 and 3 show parallel and series connections to actively-suspended plants.
Figure 3:
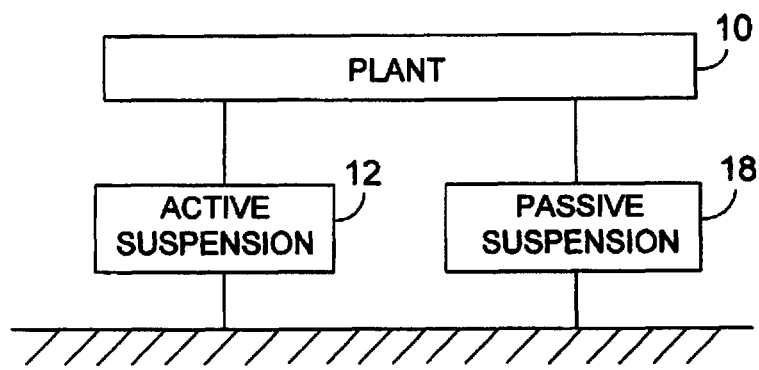

Axes that lack active suspensions need not be provided with passive suspensions at all. However, without passive suspensions in those axes, the passenger may experience discomfort. For this reason, it may be desirable to provide one or more axes with both an active and a passive suspension. In such cases, the active and passive suspensions can be placed in series with the active suspension either below the passive suspension, as shown in FIG. 2, or above the passive suspension (not shown). Alternatively, the active and passive suspensions can be placed in parallel, as shown in FIG. 3.

In some embodiments, the active suspension can be turned on and off, either indefinitely or from time-to-time, either for all axes at once, or on an axis-by-axis basis. In some cases, it may be useful to provide a fail-safe system associated with the active suspension element to dampen the motion of the plant along that axis should the active suspension element associated with that axis fail.

Alternatively, if the active and passive suspensions are in series, power to the active suspension can be cut. In such cases, any moving parts associated with the active suspension can be clamped. Once the moving parts of the active suspension are clamped, only the passive suspension will affect plant motion. In other cases, moving parts of the active suspension remain free to move in response to the action of passive suspension elements.

The vertical active suspension element 12 includes: a vertical accelerometer 20; a vertical position sensor 24; and a vertical actuator 28 that, in the embodiments shown, is in parallel with the vertical position sensor 24 and located preferably as closely as possible to the vertical accelerometer 20. Similarly, the longitudinal active suspension element 14 includes: a longitudinal accelerometer 22; a longitudinal position sensor 26; and a longitudinal actuator 30 in parallel in the longitudinal position sensor 26, and located preferably as closely as possible to the longitudinal accelerometer 22.

Actuators 28, 30 that can be used in an active suspension element 12, 14 include single or multi-phase electromagnetic actuators, such as three-phase linear actuators, single phase linear actuators, rotary actuators and variable reluctance actuators. One suitable actuator is an electromagnetic linear actuator such as that disclosed in U.S. Pat. No. 4,981,309, the contents of which are herein incorporated by reference.

Any position sensor 24, 26 with sufficient resolution and accuracy can be used. Examples of suitable position sensors 24, 26 include those having potentiometers, those that make use of the Hall effect, and those that have magnetostrictive sensors. Examples of position sensors having potentiometers include those from Novotechnik Inc, Ostfildern, Germany. Other position sensors 24, 26 that can be used with an active suspension element include those having an encoder with a limit switch for determining absolute position. Variants of this type of position sensor can also be used to derive acceleration relative to a reference frame when a sensor fixed to that reference frame is available. Examples of suitable accelerometers 20 include MEMs (micro-electro-mechanical) based accelerometers, such as those in the KXM60 series manufactured by Kionix, Inc., of Ithaca, N.Y.

To assist in suppressing its vertical motion, the actively-suspended plant 10 includes an element for removing bias force in the actuator command force signal so the actuator experiences zero-mean load. In some embodiments, this element has the dynamic characteristic of a variable low stiffness spring. The low stiffness spring characteristic ensures that the actuator is not "fighting" a spring as it tries to perform active isolation. This reduces power consumption. Such an element, which will be referred to as a "force bias eliminator system" can be implemented as an air cylinder having an associated reservoir, as shown in FIG. 14. The force bias eliminator system provides a biasing force, thereby relieving the actuator from supplying that force. Such biases may result from factors such as the weight of the plant 16. Because of the biasing force provided by the force bias eliminator system, the vertical actuator 28 need only suppress excursions from a predetermined equilibrium position. In a preferred embodiment, the air cylinder and an associated reservoir are configured such that the actuator sustains zero mean load. As discussed below, the force bias eliminator system can also provide passive suspension, either with or without additional damping.

Figure 4:
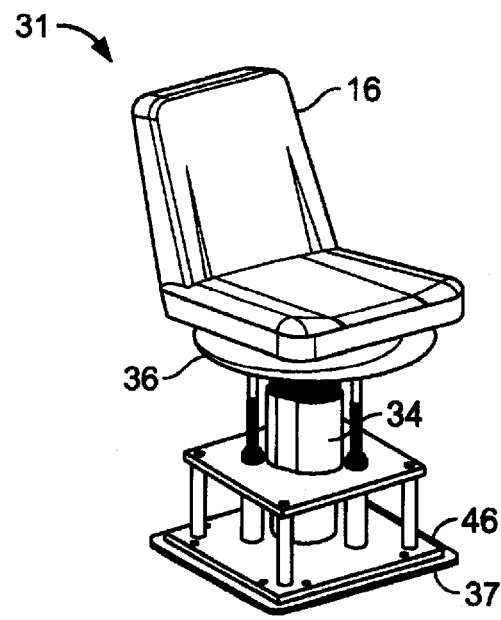
Figure 5:
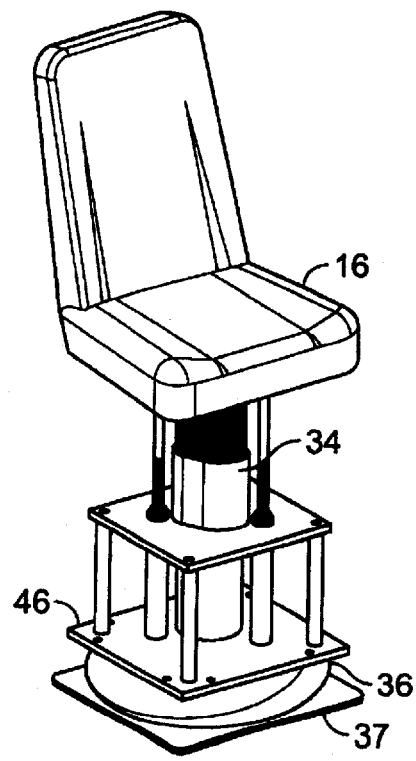

Another embodiment of an actively-suspended plant 16, shown in FIG. 4, provides a single active suspension element 34 oriented to suppress motion of a plant 16 along a vertical axis. The active suspension element 34 in this case is mounted in series with a multi-axis passive suspension element 36. As shown in FIG. 4, the multi-axis passive suspension element 36 is mounted between the active suspension element 34 and the plant 16. However, the passive suspension element 36 can also be mounted between the plant 16 and the vehicle floor 37, as shown in FIG. 5.

Figure 6:
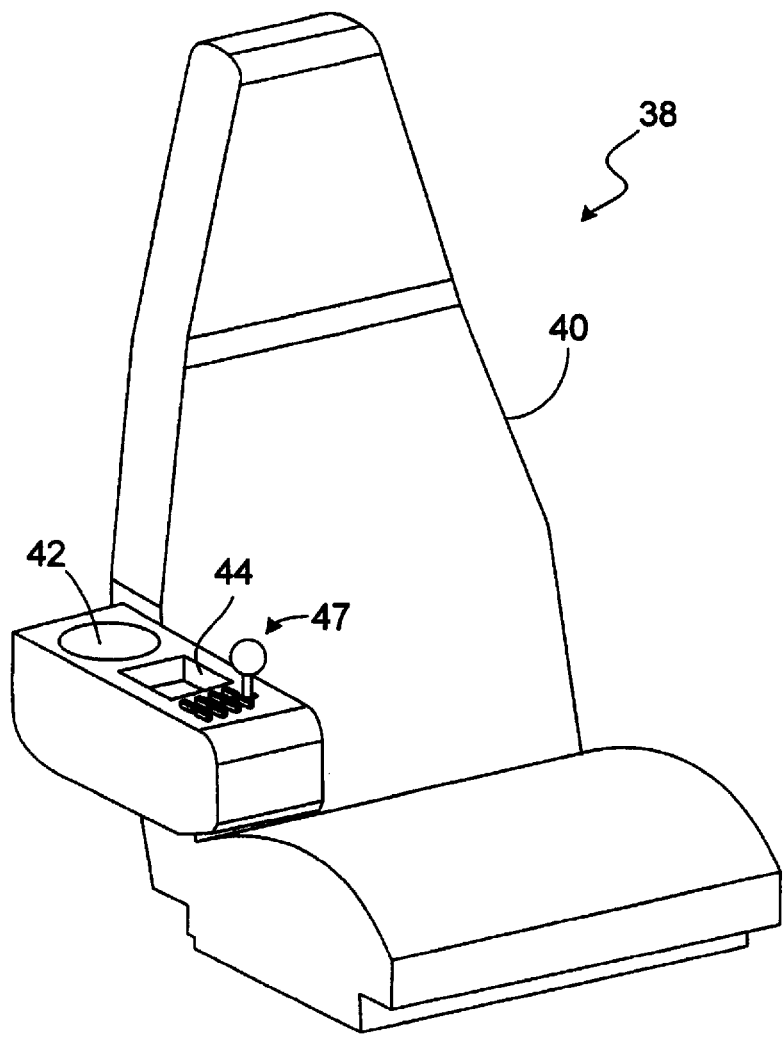

As shown in FIG. 6, a plant 16 can include various features or structures other than a seat 40 and its occupant. These additional features or structures are of the type that benefit greatly by being held stationary relative to the plant 16. Exemplary structures include a cup-holder 42, which often hold drinks susceptible to spillage in response to random accelerations of the vehicle, a writing surface, a data entry/retrieval device, an ashtray or other receptacle 44, a display, such as a navigation display, and controls 47, particularly controls that do not require a direct mechanical linkage to the vehicle. Exemplary controls include electronic controls for operation of heavy equipment, and controls, such as pedals or levers, for braking and acceleration. Although as shown the features or structures are attached to the plant 16, it should be noted that features or structures may be remotely located (not shown) from the plant 16 but "slaved" to the motion of the plant 16.

Figure 7:
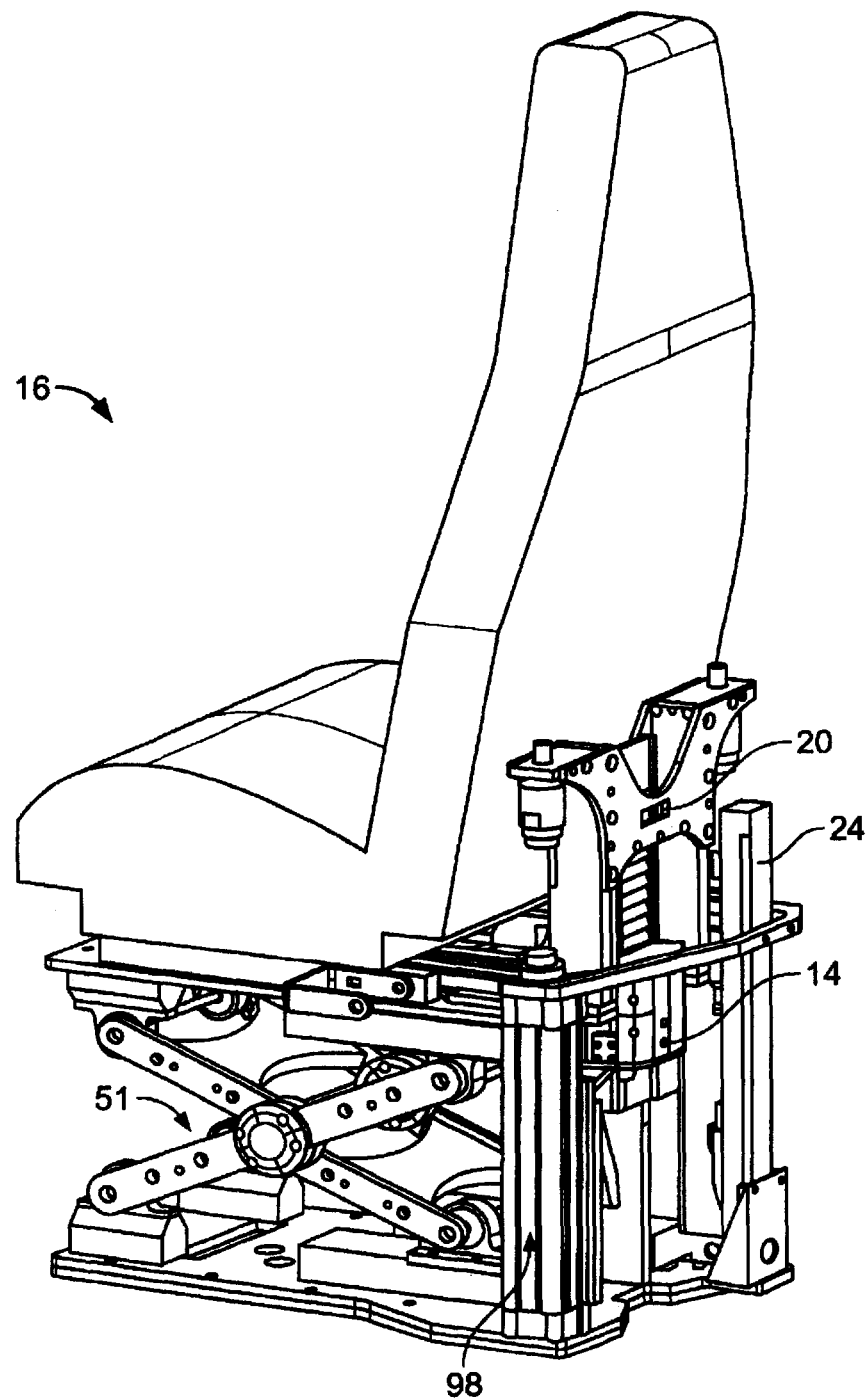

The actively-suspended plants 16 shown in FIG. 1 and FIGS. 4-7 include a base 46 that is configured to bolt into standard bolt patterns found in various makes and models of motor vehicles. However, the actively-suspended plants 16 can be supported by any of a variety of support structures, including a scissors mechanism 51 as shown in FIG. 7, a modified scissor mechanism, a four-bar linkage, and a modified four-bar linkage to be used when the actuator is one for which the ratio of actuator stroke to seat travel is less than unity. Moreover, the actuators themselves can be designed as part of the support structure.

Figure 8:
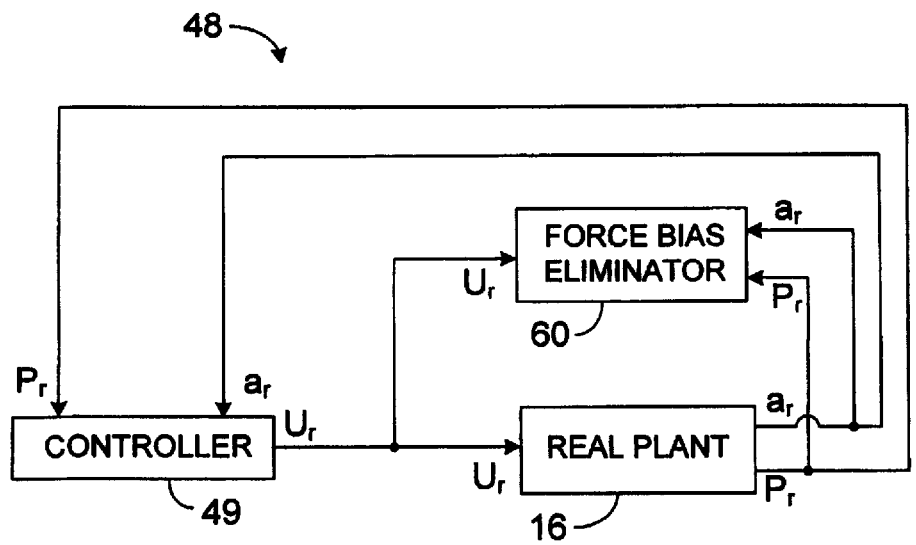
FIG. 8 shows a control system for controlling actively-suspended plants of FIG. 1 and FIGS. 4-7.

The active suspension elements 12, 14 are in data communication with a control system 48, shown in more detail in FIG. 8. The control system 48 receives data signals, such as plant acceleration $a_n$ and the position $p_r$ of the plant 16 relative to the vehicle, from the sensors 24, 26. In return, the control system 48 provides, via a controller 49, control signals $u_r$ for causing the respective actuators 28, 30 (see FIG. 1) to exert forces that tend to: restore the plant 16 to an equilibrium position; and minimize the acceleration experienced by the plant 16. The data signals can represent position and acceleration of the plant 16, as well as data indicative of properties of the plant 16. A force bias eliminator module 60 in communication with the plant 16 removes the bias from the actuator force control signal $u_r$ so as to maintain zero mean load to the actuator.

In practice, the relevant characteristics of the real plant 16 may not be known precisely. In general, therefore, the design of any controller 49 and the resulting control signal ($u_r$) output by that controller 49, would be based on assumptions about those characteristics. As a result, the control signal used to control the real plant 16 may not achieve the expected result. Therefore, the control system 48 estimates errors in the assumptions concerning the real plant 16 and compensates for those errors. In some embodiments, such as those described below, this estimation and compensation makes use of a reference model.

Figure 9:
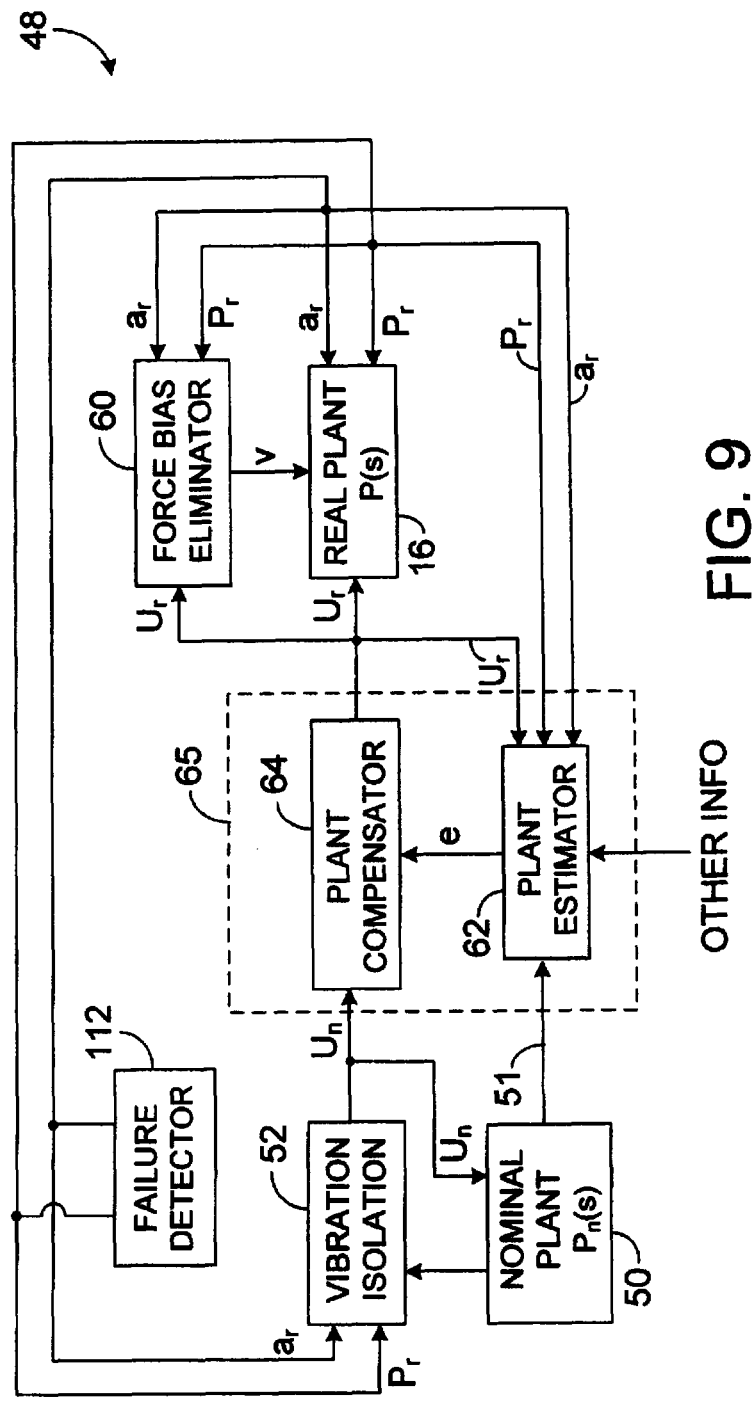
FIG. 9 shows an embodiment of the control system of FIG. 8.

FIG. 9 shows an exemplary control system 48 in which a reference model includes a mathematical reference model 50 of a nominal plant in the form of that nominal plant's response, Pn(s), to complex frequency inputs, s. For brevity of expression, this mathematical model 50 of the nominal plant will be referred to simply as the "nominal plant 50." The response, Pn(s), of the nominal plant is used by the vibration isolation module 52, together with data indicative of a real plant's position and motion, to calculate a nominal control signal $u_n$.

The nominal plant 50 is thus a reference model for the real plant 16. Such a model can be defined to include one or more parameters, including: desired performance characteristics, frequency response, poles/zeros, or any combination thereof. For example, in the case of a real plant 16 that includes a vehicle seat, a parameter representing a nominal driver weight can be defined as the average weight across a large number of representative drivers.

Figure 10:
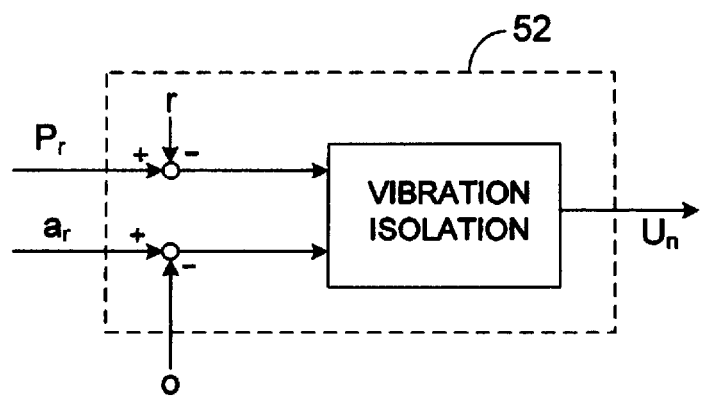
FIG. 10 shows a vibration isolation module.

A variety of methods are available for implementing the vibration isolation module 52. For example, FIG. 10 shows a vibration isolation module 52 that includes a position and an acceleration feedback signal. In some implementations, a position controller having a position feedback loop takes a relative position signal $p_r$ as input and urges the real plant 16 to maintain a predetermined equilibrium position r. In some cases, the equilibrium position may correspond to the midpoint of an actuator stroke. In other implementations, an acceleration controller having an acceleration feedback loop takes an acceleration signal $a_r$ as input and controls the acceleration experienced by the real plant 16.

To facilitate discussion, the following description is based on a two-loop control structure. However, in general, the controller uses both position and acceleration of the real plant 16 as inputs and provides a control signal as an output. The implementation need not be a two-loop controller structure. For example, the controller can have a single loop. Other embodiments include controllers having 2n inputs and n outputs, where n is the number of actively controlled axes.

The bandwidth of the position loop can be designed on the basis of a passenger's perception of discomfort. This varies with the particular axis along which movement of the real plant 16 is to be controlled. For example, most passengers tolerate greater vibration in the vertical direction than in the fore-aft direction. In addition, the spectrum of vibration in the fore-aft direction generally has larger high-frequency components than does the spectrum of vibration in the vertical direction. Accordingly, in some embodiments, a position loop used to suppress vibration in the vertical direction has a smaller bandwidth than does a position loop used to suppress vibration in the horizontal direction. When more than one axis is actively controlled, the position loop for each active axis can have a bandwidth tailored to accommodate the vibration characteristic along that axis.

In the implementation shown in FIG. 10, the measured position signal, $P_r$, which represents the relative displacement between the real plant 16 and the vehicle's frame, is subtracted from a desired equilibrium position, r, of the plant 16. The resulting difference is provided as an input to the vibration isolation module 52. The measured acceleration signal, $a_r$, is subtracted from a desired acceleration, which in the illustrated embodiment is a zero acceleration. The resulting difference is provided as an input to the vibration isolation module 52. The output of the vibration isolation module 52 is the nominal control signal $u_n$. Suitable vibration isolation modules 52 include those described in U.S. Pat. Nos. 3,701, 499 and 6,460,803, the contents of which are herein incorporated by reference.

In some cases, it may be desirable to change the desired equilibrium position r of the real plant 16 while actively controlling the plant 16. For example, when the real plant 16 includes a seat, it may be desirable to adjust the seat height to accommodate different occupants. This can be done by changing the desired equilibrium position r. For the control system 48 shown in FIG. 9, the change in the described equilibrium position, r, will cause a bias force component in the control signal, $u_r$. The need for this bias force component is removed by the force bias eliminator module 60.

As noted above, the vibration isolation module 52 generates a nominal control signal that would be used to control motion of a nominal plant 50 were that nominal plant 50 to experience certain disturbances represented by the measured position and acceleration signals. In order to make the vibration isolation module 52 generate a nominal control signal, signals $a_r$, $p_r$ indicative of these disturbances are provided as inputs to the vibration isolation module 52. However, in general, the nominal plant 50 has dynamic characteristics that differ from those of the real plant 16. Therefore, the output of the vibration isolation module 52 will, in general, not be optimized for controlling the movement of the real plant 16 subject to those same disturbances.

In most cases, however, the nominal plant 50 and the real plant 16 have similar enough dynamic characteristics so that a control signal for controlling the real plant 16, referred to herein as the "real control signal" is similar to the nominal control signal.

It is important to note that there is no actual nominal plant 50 that is undergoing any actual physical movement. What there is a model of a nominal plant. This model is selected to respond in a manner similar to how a real plant 16 might respond.

In effect, the control system 48 uses the nominal plant 50 to simulate the response of the real plant 16 to a control signal. The control system 48 has, at its disposal, the hypothetical response of the nominal plant 50 to a control signal and the actual measured response of a real plant 16 to that control signal. On the basis of a difference between the hypothetical response and the actual measured response, the control system 48 adjusts the control signal.

To compensate for the difference between the real plant 16 and the nominal plant 50, the control system 48 includes a plant estimator 62 that estimates this difference based at least in part on signals indicative of the motion experienced by the real plant 16. The plant estimator 62 then provides an error signal e(s) representative of that difference to a plant compensator 64. The plant compensator 64 then compensates for the difference by modifying the nominal control signal $u_n$ before applying it to the real plant 16. The combination of the plant estimator 62 and plant compensator 64 is referred to as a "compensation system 65." Although the plant estimator 62 and compensator 64 are shown as being separate from each other, this is done only to illustrate their separate functions. In practice, the functions of a plant estimator 62 and compensator 64 can be carried out by circuitry embodied in a single hardware element, or in software.

Figure 11:
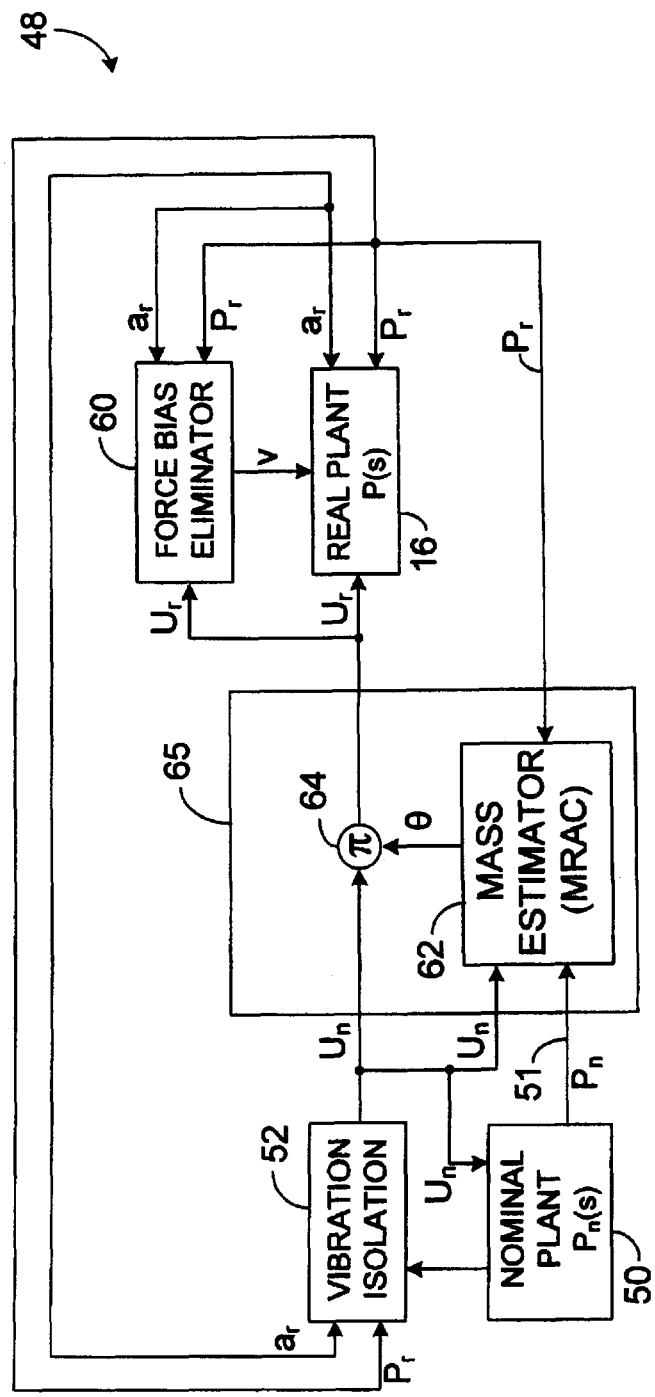
FIGS. 11-12 show a control system with different types of plant estimators.

In essence, the plant compensator 64 uses the error signal to perturb the nominal control signal, $u_n$. The result of that perturbation is the real control signal, $u_r$, which is applied to the real plant 16. As shown in FIG. 11, the plant compensator 64 includes a multiplier. However, the plant compensator 64 can also include a filter. Note that as used herein, "real" indicates that the control signal is to be applied to the real plant 16. It does not have its usual mathematical meaning of a signal having no imaginary component.

In FIG. 9, the plant estimator 62 is shown as accepting a variety of inputs, among which are: real disturbance signals indicative of the disturbance experienced by the real plant 16, e.g. position and acceleration signals $a_r$, $p_r$ and nominal disturbance signals 51 indicative of corresponding disturbances that would be experienced by a nominal plant 50 being controlled by the nominal control signal $u_n$. Alternatively, other information obtained from outside the control system 48 can be used to estimate the difference, as discussed below. These inputs represent potential sources of information that the plant estimator 62 can use to generate an error signal. Embodiments of the plant estimator 62 need not actually receive or make use of all the information sources shown in FIG. 9, but may instead receive or make use of a subset of those sources.

The details of designing the compensation system 65 depend on the control objective to be achieved. In one embodiment, shown in FIG. 11, the control objective for the compensation system 65 is to maintain a constant bandwidth of the open acceleration loop transfer function, as defined by the frequencies at which the magnitude of the open acceleration loop transfer function crosses the 0 dB line, independent of any plant differences such as those caused by the passenger weight. The compensation system 65 does so by adaptively adjusting the gain of the acceleration loop transfer function in response to a difference between a real acceleration experienced by a real plant 16 and a nominal acceleration that would be experienced by a nominal plant 50 under the same circumstances.

A suitable compensation system 65 in such a case is a model reference adaptive controller. In this case, the plant estimator 62 generates an error signal, e(s), on the basis of a real acceleration signal $a_r$ from the real plant 16 and a nominal acceleration signal $u_n$ representing the acceleration that would have been experienced by the nominal plant 50. The plant compensator 64 in this case is a multiplier that multiplies the nominal control signal, $u_n$, with the error signal, e, to obtain the real control signal, $u_r$.

Figure 12:
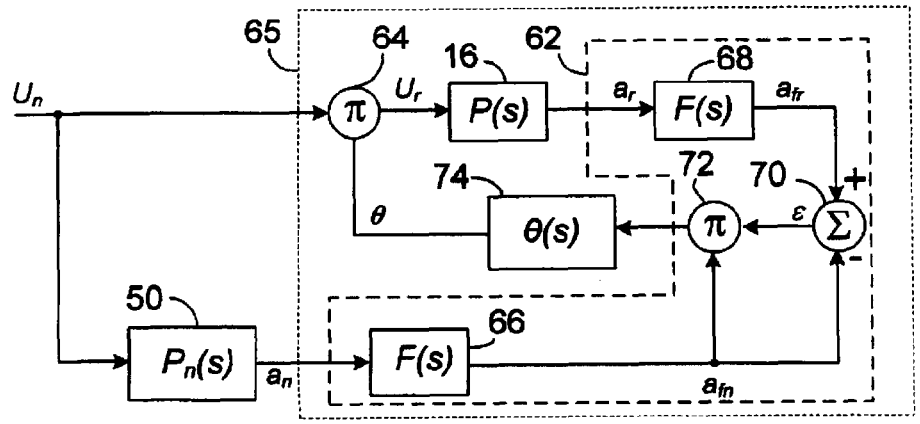

As shown in FIG. 12, a compensation system 65 implemented using a model reference adaptive controller includes a first filter 66 that filters the nominal acceleration, $a_n$, that a nominal plant 50 would have experienced under the same circumstances, and a second filter 68 that filters the actual acceleration, $a_r$, experienced by the real plant 16. The nominal acceleration $a_n$ is obtained as an output of the nominal plant 50 when using nominal control signal, $u_n$ as input.

The output of the first filter 66 is the filtered nominal acceleration, $a_{fn}$, and the output of the second filter 68 is the filtered actual acceleration $a_{fr}$. The first and second filters 66, 68 are centered on the desired cross over frequency (i.e., the 0 dB frequency).

The filtered nominal acceleration is subtracted from the filtered actual acceleration at a subtractor 70 to generate an error signal. This error signal can be further processed in a variety of ways to minimize some quantity indicative of the error e.

In the embodiment shown in FIG. 12, the quantity indicative of the error to be minimized is the least mean square (LMS) of the error e. This is achieved by multiplying the error signal with the filtered nominal acceleration, $a_{fn}$, at a multiplier 72. The result of this operation, which is the derivative of the compensation signal is then provided to an integrator 74. The output of the integrator 74 is then multiplied with the nominal control signal to generate the real control signal.

An optional feature of the compensation system 65 is that of causing the integrator 74 to provide unity output under certain special circumstances. Under these special circumstances, when the output of the integrator 74 is multiplied with the nominal control signal, the nominal control signal would remain unchanged. Hence, the real control signal would be the same as the nominal control signal. Exemplary special circumstances would include the detection of a nominal control signal that would cause the actuator to exert very small forces, on the order of frictional forces. Other special circumstances include detecting an acceleration that is below a threshold, or any combination thereof.

FIG. 12 shows a specific embodiment of a compensation system 65 that compensates for just one of the many factors, in this case a change in the dynamic properties of the real plant 16. Such a change might result, for example, from differences in passenger weight that might result in a difference between the dynamic properties of a real plant 16 and a nominal plant 50. However, the compensation system 65 can be designated to compensate for other such factors. One such factor includes drift in power electronics parameters.

The control system 48 is an analog system that makes use of continuous time signals. However, the control system 48 can also be implemented in discrete time, in which case the integrator 74 becomes a summation block and the low-pass filters 66, 68 become suitably defined digital filters.

As noted above, the vertical active suspension element 12, which suppresses motion in the vertical direction, includes a vertical actuator 28 that exerts the forces necessary to maintain the plant 16 at an equilibrium vertical position. However, in the vertical direction, the plant 16 is constantly subjected to the force of gravity. As a result, the actuator 28 consumes considerable energy simply supporting the weight of the plant 16.

In one implementation, a force bias eliminator system is provided to exert a bias force in the vertical direction that is sufficient to offset the force bias component in the real control signal, $u_r$, thereby maintaining zero mean load for the vertical actuator 28. With the force bias eliminator system thus available, the vertical actuator 28 is spared having to exert a force simply to hold the plant 16 in its equilibrium position. Instead, the vertical actuator 28 need only exert forces to compensate for brief excursions from the equilibrium position.

A force bias eliminator system as described above is not strictly necessary. In principle, one could simply cause the vertical actuator 28 to exert a suitable bias force. Such a configuration may be practical if, for example, a room-temperature superconductor were available to carry the current required to generate such forces. However, for known electromagnetic actuators, the currents required to support a plant 16 would be uncomfortably large, and would generate considerable waste heat.

The force bias eliminator system can be a relatively simple one, such as an adjustable spring or a device that has the mechanical properties of a low stiffness adjustable spring.

A suitable force bias eliminator system preferably operates whether or not the vehicle is turned on. This will enable the occupants of the vehicle to remain comfortably seated with all power shut down. Such a feature is also important for safety. It would be most disconcerting if, in an automobile traveling at highway speeds, loss of power were immediately followed by a sudden drop in the position of all seats.

To provide control over this force bias eliminator system, the control system 48 also includes a force bias eliminator module 60 (see FIG. 11) whose function is to cause the force bias eliminator system to provide a suitable bias force under a variety of changing circumstances. As shown in FIG. 9, the force bias eliminator module 60 receives acceleration and position data from the real plant 16 as well as the real control signal, $u_r$, from the compensation system 65. On the basis of this data, the force bias eliminator module 60 provides a bias control signal to the force bias eliminator system, as discussed below in connection with FIG. 13.

Figure 13:
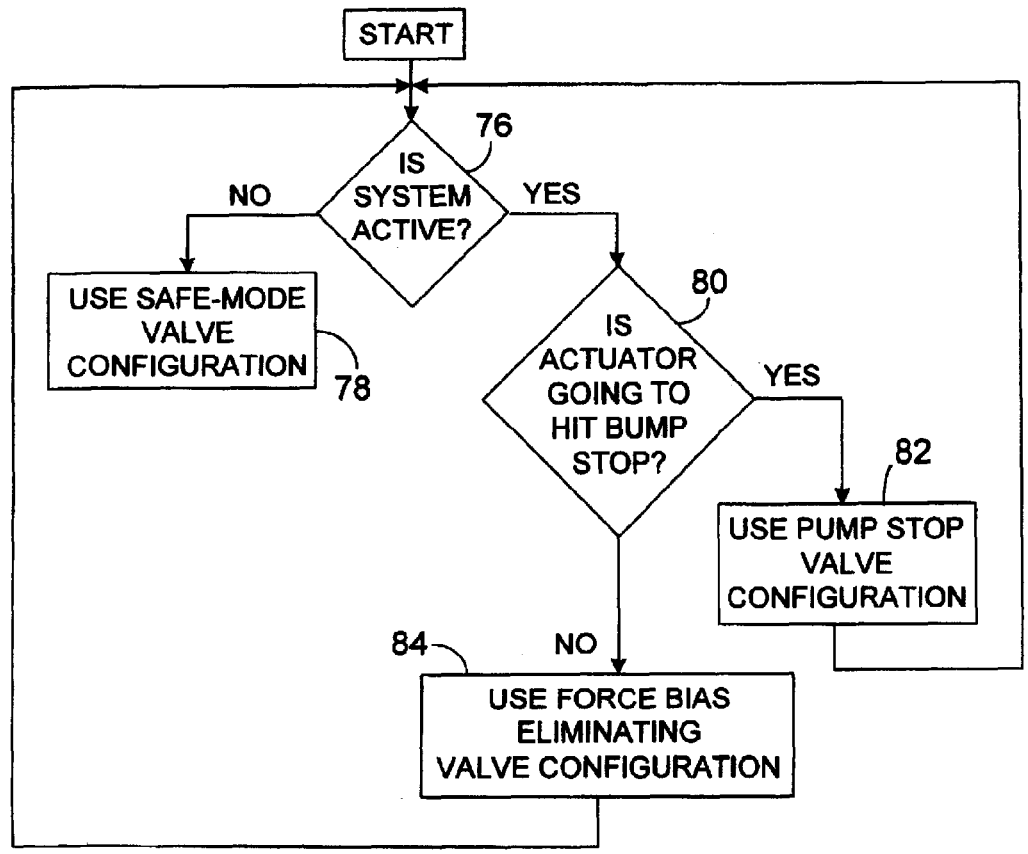
FIG. 13 is a flow-chart of an algorithm used by a force bias eliminator.

As described below, the active suspension system is configured to operate in a plurality of modes: a safe (passive/failsafe) mode, an active (force bias elimination) mode, and a bump stop mode. As shown in FIG. 13, the system, via the force bias eliminator module 60 or a separate fail-safe system (see details below), first detects the occurrence of a trigger event. A trigger event can occur in response to any change in a characteristic of plant 16 that may indicate an abnormal state. Exemplary trigger events include failure of an active suspension element, a severing of a power cable, or a sensor failure (step 76). Upon detection of a trigger event, the force bias eliminator module 60 causes the force bias eliminator system 86 to operate in a mode referred to as "passive mode," "safe mode," or "fail-safe mode" (step 78). In this mode, the position of the plant 16 is adjusted via the force bias eliminator module 60, as discussed below in connection with FIGS. 14 and 15. In some embodiments, switching to "passive mode" operation can also be implemented as a user-selectable feature. Whether or not the active suspension elements are operating can readily be determined by, for example, detecting power being supplied to them. If the system determines that the active suspension elements are currently operating, it then uses the acceleration and position signals from the real plant 16 to determine whether the vertical actuator 28 is likely to reach the end of its travel, i.e. whether the vertical actuator 28 is likely to strike one of its two bump stops (step 80). If so, the force bias eliminator module 60 causes the force bias eliminator system to operate in "bump-stop" mode (step 82). Otherwise, the force bias eliminator module 60 causes the force bias eliminator system to operate in normal mode or "active mode" (step 84), as discussed below in connection with FIGS. 14 and 15, in which the position of the plant 16 is adjusted by controlling one or more actuators.

An exemplary force bias eliminator system 86 is a pneumatic force bias eliminator (shown in FIG. 14) that includes a cylinder 88 and a matching piston 90 on which the plant 16 is supported. The cylinder volume below the piston head, i.e. the "lower cylinder chamber," is connected either to a compressed air source (not shown), by way of a supply valve 92, or to ambient air, by way of a bleed valve 94. Alternatively, the lower cylinder chamber can be connected to either a compressed air source (not shown) or to ambient air by operating a three-way manual adjustment valve 96. The compressed air source can be a readily available on-board air source, such as a reservoir of compressed air maintained at high pressure by a pump. Hollow portions of the seat structure can also be used as air reservoirs, thereby incorporating, or integrating, the air reservoir in the seat structure itself. Alternatively, the force bias eliminator system can be a hydraulic system.

The cylinder 88 can include a piston 90 that moves in response to air pressure and to the plant weight. Or, the cylinder 88 can simply expand and contract in response to pressure and weight, in much the same way that a rubber tire will expand and contract. An expansion chamber 98, which is in fluid communication with the air cylinder 88, can be an external air-reservoir. Alternatively, the expansion chamber 98 can be built into the seat structure itself, thereby conserving space within the vehicle interior.

In normal mode or "active mode," the force bias eliminator module 60 determines, based, for example, on a control signal $u_r$ as shown in FIG. 11, whether the pressure needs to be increased or decreased. If the pressure needs to be increased, the force bias eliminator module 60 causes the supply valve 92 to open and the bleed valve 94 to close, thereby flooding the lower cylinder chamber with compressed air. Conversely, if the pressure needs to be decreased, the controller causes the supply valve 92 to close and the bleed valve 94 to open. This bleeds high-pressure air from the lower cylinder chamber.

FIG. 15 shows the process of detecting and removing the bias component of the real control signal by using the real control signal $u_r$ as an input to the force bias eliminator module 60 operating in active mode. The real control signal $u_r$ is first passed through a low-pass filter 100 to remove high frequency variations that are more likely to be the result of attempts to cancel random accelerations. The low-pass filter 100 thus isolates the low frequency variations that are more likely to be the result of actual weight changes in the plant 16. A suitable low pass filter 100 is one having a corner frequency on the order of 0.5 Hz.

The force bias eliminator module 60 then uses the sign, or phase angle, of the low frequency components of the real control signal to determine whether to exert a bias force to offset the bias signal components in $u_r$. For the implementation of FIG. 15, the force bias eliminator module 60, which takes the real control signal $u_r$ as an input, determines whether pressure against the piston 90 needs to be increased or decreased. The force bias eliminator module 60 then sends appropriate valve-actuation signals V to a supply valve relay (not shown) that controls the supply valve 92 and to a bleed valve relay (not shown) that controls the bleed valve 94. If the pressure needs to be increased, the force bias eliminator module 60 sends a signal to the supply valve 92 relay to open the supply valve and a signal to the bleed valve relay to close the bleed valve 94. Conversely, if pressure needs to be decreased, the force bias eliminator module 60 sends a valve-actuation signal V to the bleed valve 94 relay to open the bleed valve and a signal to the supply valve relay to close the supply valve 92. In some embodiments, relays with "backlash" (hysteresis) prevent chatter of the on-off valves around the relay's set-point.

The force bias eliminator system 86 also includes upper and lower bump stop valves 102, 104 that are used, in "bump-stop" mode, to resist movement in those circumstances in which the vertical actuator 28 is unlikely to prevent the plant 16 from abruptly reaching the end of its travel.

The upper bump stop valve 102 provides a path between the cylinder volume above the piston head (the "upper cylinder chamber") and the ambient air. In normal operation, this upper bump stop valve 102 is left open so that air can move freely in or out of the upper cylinder chamber. However, if the force bias eliminator module 60 detects that the vertical actuator 28 is unlikely to be able to stop the plant 16 from reaching the top of its travel, it closes the upper bump stop valve 102. This prevents air from escaping from the upper cylinder chamber as the piston 90 moves upward. As a result, the air is compressed as the piston 90 travels upward, thereby exerting a force that tends to resist further upward movement of the piston 90 (and hence the plant 16).

The lower bump stop valve 104 provides a path between the lower cylinder chamber and either the ambient air or the compressed air supply, depending on which of the bleed valve 94 and the supply valve 92 is open and which is shut. In normal operation, the lower bump stop valve 104 is left open. This permits the force bias eliminator module 60 to freely control the plant height by selectively opening and closing the bleed valve 94 and the supply valve 92. However, if the force bias eliminator module 60 detects that the vertical actuator 28 is unlikely to stop the plant 16 from reaching the bottom of its travel, it closes the lower bump stop valve 104. This prevents air from escaping from the lower cylinder chamber as the piston 90 moves downward, thereby exerting a force that tends to resist further downward movement of the piston 90 (and hence the plant 16).

When the force bias eliminator module 60 determines that the active suspension element has been disabled, it sends a valve actuation signal V to seal off the upper and lower chambers by closing the upper and lower bump stop valves 102, 104 simultaneously. This causes the force bias eliminator system 86 to operate in "safe mode," which is a mode in which the force bias eliminator system 86 functions as a spring. When operating in safe mode, the only way for air to enter and leave the cylinder 88 is through the three-way manual adjustment valve 96. The three-way manual adjustment valve 96 has: a closed position, in which no air can enter or leave the lower chamber; a bleed position, in which the lower chamber is connected to ambient air; and a fill position, in which the lower chamber is connected to a compressed-air source (not shown).

In safe mode, the level of the plant 16 is controlled by operating the adjustment valve 96. To raise the plant 16, the adjustment valve 96 is made to connect the compressed air supply to the lower cylinder chamber. To lower the plant 16, the adjustment valve 96 is made to connect the ambient air with the lower cylinder chamber. When the plant 16 is at the desired position, the adjustment valve 96 is made to seal the lower cylinder chamber.

The following table summarizes the configuration of the various valves shown in FIG. 14 during various operation modes:

| | SAFE MODE | FORCE BIAS ELIMINATION MODE | UPPER BUMP STOP | LOWER BUMP STOP |
|---|---|---|---|---|
| Lower bump stop valve 104 | Close | Open | Open | Close |
| Bleed valve 94 | Open or close | Open to lower Close to raise | Close | Close |
| Supply valve 92 | Close | Open to raise Close to lower | Close | Close |
| Upper bump stop valve 102 | Close | Open | Close | Open |
| 3-way valve 96 | 3 way | Close | Close | Open |

As noted above, during force bias elimination mode, a compressed air source can be in communication with the lower chamber of the cylinder 88. Should the vertical actuator 28 need to lower the plant 16 momentarily, it may find it difficult to do so because the compressed air source will resist downward motion of the plant 16. To enable the vertical actuator 28 to more easily lower the plant 16, the force bias eliminator system includes an expansion chamber 98 disposed between the supply valve 86 and the lower bump stop valve 104. The expansion chamber 98 functions as a weak spring so that should the vertical actuator 28 have to lower the plant 16, it will encounter minimal resistance from the compressed air source.

When a plant parameter changes suddenly, for example when an occupant sits down or stands up, or when cargo is removed or added, the maximum force that the actuator would need to exert can be reduced, thereby reducing power usage. This is achieved by having the control system wait for the force bias eliminator system to adapt to the new load. After the force bias eliminator system has adapted, the actuator can be made to exert a reduced force needed for normal operation. For example, when a seated occupant stands up, the force bias eliminator system, when implemented as an air spring, will dump pressure quickly. Once it completes dumping pressure, the actuator is made to exert whatever forces are needed to actively suspend the now unoccupied seat. As a result, the seat height remains approximately constant when the occupant arises. By contrast, a seat supported by a conventional spring will spring back up to an unloaded position when the occupant.

The force bias eliminator system 86 disclosed in connection with FIG. 14 is a pneumatic system that implements pneumatic logic to carry out its operation. However, other types of force bias eliminator systems, such as hydraulic systems can be used to apply a bias force to the plant 16.

Figure 16:
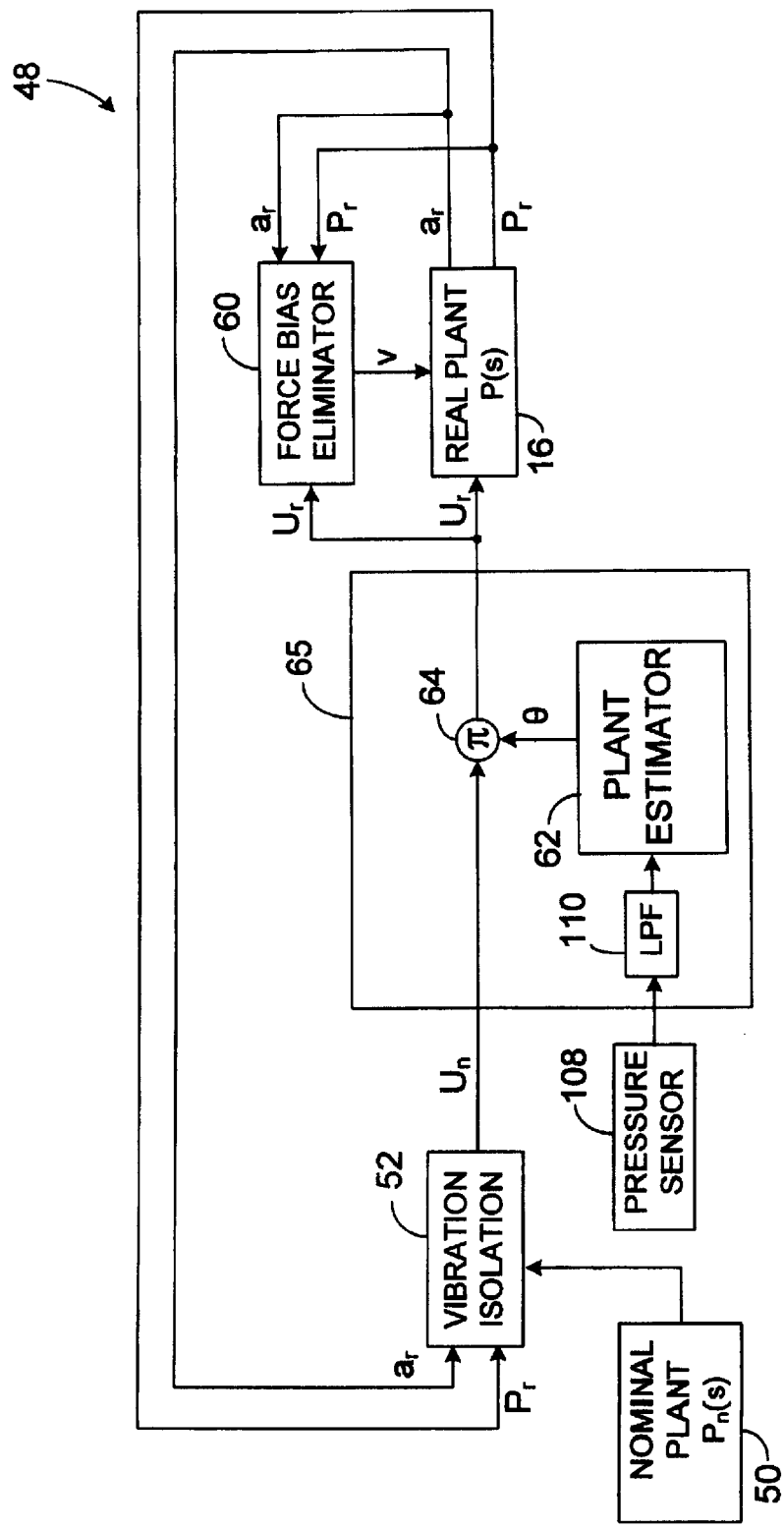
FIG. 16 shows a control system in which the weight of the plant is measured.

The pneumatic force bias eliminator 86 described above can be used to implement embodiments of the plant estimator 62 that measure the mass of the plant 16 directly. In such embodiments, shown in FIG. 16, a bias pressure is measured by a pressure sensor 108 and excursions from the bias pressure, after suitable filtering, indicate the weight of the plant 16. The bias pressure is the pressure that results from supporting a nominal plant 50. This pressure can be measured at the factory or following seat installation and can be programmed into the plant estimator 62. The pressure sensor 108 measures pressure at any point in the pneumatic system at which there exists a measurable pressure that depends on the weight of the plant 16. The pressure measured by the pressure sensor 108 is then passed through a low-pass filter 110 to eliminate any jitter. The result is then provided to the plant estimator 62, which determines an error signal to be used for perturbing the nominal control signal.

The above description has focused on reference-model-based control design as shown in FIG. 9. However, other embodiments include the general control system shown in FIG. 8, in which the controller can be designed via suitable linear or nonlinear control methods, with or without a reference model. For example, the vibration isolation module in FIG. 9 can replace the controller module 52 in FIG. 8 without the need to provide a nominal plant 50, a compensation system 65 or a force bias eliminator module 60.

A failure in an active suspension element, particularly a vertical active suspension element 12, may result in a sudden and possibly alarming change in the plant's position and motion. To avoid this, the control system 48 can be provided with a fail-safe system controlled by a failure-detector 112, as shown in FIG. 9. The fail-safe system has a selectively-activated damper coupled to the actuator. The damper may be a separate element. Alternatively, the damper may be implemented by changing characteristics of an active suspension element. Under normal circumstances, the damper is deactivated and therefore generates no damping force. However, if the failure detector 112 detects the existence of a particular condition, it activates the damper, thereby causing a damping force that resists motion of the plant 16. This causes the plant 16 to settle gracefully to the lower bump stop. Alternatively, the fail-safe system can include a spring or a structure that functions as a spring. One such structure is the force bias eliminator system as described earlier. In such a case, the plant 16 will settle to an equilibrium position above the lower bump stop.

As shown in FIG. 9, the failure detector 112 is provided with information indicative of the state of the real plant 16. This information can include, for example, the position and acceleration signals. On the basis of this information, the failure detector 112 determines whether it is necessary to dampen the motion of the plant 16. A suitable damper for use in connection with an actuator 12 is described in U.S. Pat. No. 4,981,309, the contents of which are herein incorporated by reference.

Failure of the active suspension system is not the only reason to activate the fail-safe system. Any change in a characteristic of the plant 16 that may indicate an abnormal state may be a reason to activate the fail-safe system. For example, a sensor signal larger than a predetermined threshold, or a failure in any of the sensors that collect information indicative of the state of the plant, would be reasons to activate the fail safe system. Sensor or system failure can be detected by noting the absence or fluctuating presence of such signals, or by sensor signals that provide information inconsistent with physical constraints on the plant. For example, if a sensor were to indicate that an automobile was now moving at supersonic speeds, the reliability of that sensor might reasonably be called into question, in which case the fail-safe system would be activated. Alternatively, detecting that a sensor has reached the end of its useable range can also activate the fail-safe system. In some embodiments, the particular trigger event that causes transition from active mode to fail-safe mode, or "passive mode," can also be implemented as a user-selectable feature.

In the case of an electromagnetic actuator, a stator having a coil of wire surrounds an armature on which the real plant 16 is mounted. The stator and armature together form an "electromagnetic actuator," with the position of the armature being controllable by the current in the coil of the stator. In normal operation, the current through the coil generates a magnetic field that controls the position of the armature. Upon detection of failure, the leads of the coil are shorted, or clamped together. Under these circumstances, Lenz's law will operate to induce a current in the coil that generates a magnetic field tending to resist movement of the armature. As a result, the electromagnetic actuator functions as a damper.

FIG. 17 is an exemplary algorithm used by failure detector 112 in determining whether to activate the damper following detection of a sensor failure. The failure detector 112 monitors the acceleration signal (step 114). If the acceleration signal is within pre-selected limits (step 116), the failure detector 112 assumes that the active suspension element is operating correctly. Under these conditions, the damper remains deactivated. The failure detector 112 then waits (step 118) and inspects the acceleration again (step 114). However, if the failure detector 112 detects that the acceleration signal is in excess of a threshold magnitude for longer than a predetermined duration (step 116), the failure detector 112 assumes that the active suspension has failed, and that remedial action is in order. Under these circumstances, the failure detector 112 activates the damper (step 120). The failure detector 112 then stops further execution (step 122) until a reset occurs.

The algorithm described in connection with FIG. 17 relies only on the detection of a failure in the acceleration sensor. However, other algorithms can use the position signal, or a combination of the position and acceleration signal, or any information indicative of the state of the real plant 16. Other algorithms for controlling the fail-safe system use information indicative of the condition of the various elements that make up the active suspension and associated components: such as the power supply, the power amplifier, the controller itself, etc. Exemplary information includes electrical bias signals to sensors, and electro-motive forces generated by the actuator. Furthermore, redundant sensors can be used to improve system reliability.

Figure 18:
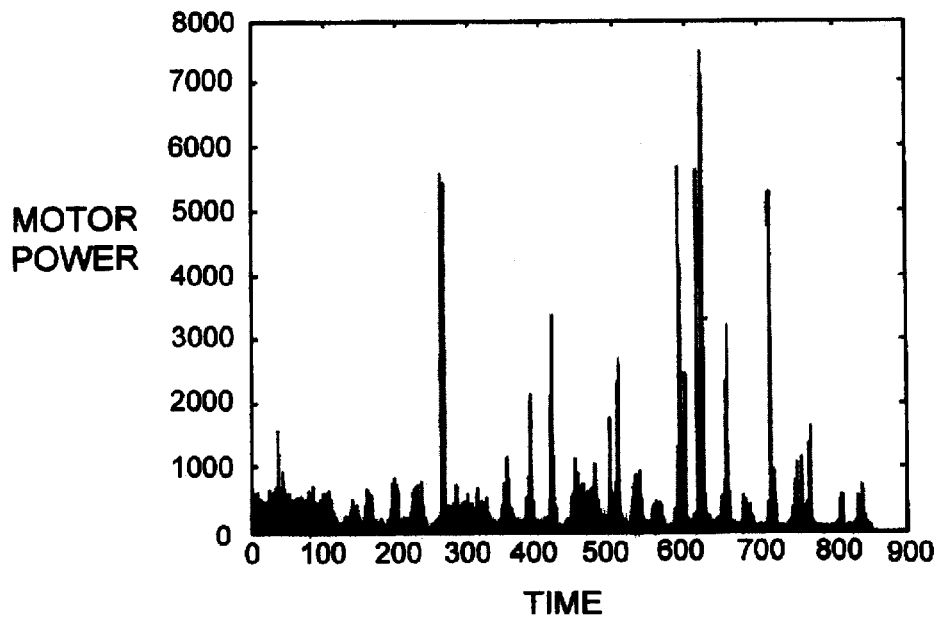
FIG. 18 illustrates typical power demands.

The real plant control signal is ultimately used to modulate an output current of an amplifier 106, as shown in FIG. 18. This output current is ultimately provided to an electromagnetic actuator 28. Fluctuations in the control signal result in fluctuations in this output current.

The current to be modulated at the amplifier 106 (shown in FIG. 19) is provided by a power supply 107. In an active suspension system of the type described above, under normal operation on a smooth road, the amplifier 106 draws relatively small amounts of power. However, to compensate for conditions such as large bumps on the road surface, the amplifier 106 requires short bursts of high power. FIG. 18 illustrates the required power as a function of time for a typical urban street having occasional pot holes and other irregularities.

As shown in FIG. 18, in normal operation, the amplifier 106 draws an average power. However, occasionally, the amplifier 106 requires significantly more power, for short periods. To provide short bursts of high power, it is useful to provide the amplifier 106 with a power supply 107 having an energy storage element capable of providing short bursts of high power without drawing directly on a power source, such as a battery.

Figure 19:
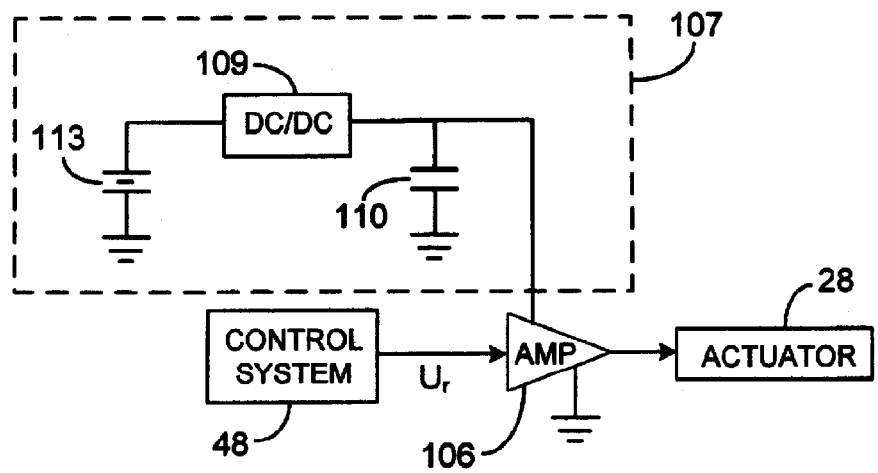
FIG. 19 shows a power supply.

A suitable power supply 107, shown in FIG. 19, includes a DC/DC converter 109 having an input connected to a battery 113 and an output connected to a capacitance 110. The DC/DC converter 109 functions to transform the battery voltage, which is nominally 12 volts, into a higher output voltage. An additional effect of the converter 109 is to limit the amount of current drawn from the battery 113 by saturating when the amplifier's demand for current exceeds that which the converter 109 can provide. Under these circumstances, the converter 109 appears to the amplifier 106 as a constant current source providing a saturation current.

In general, in response to a change in parameters (such as output current, input power) of a converter circuit delivering power, additional power can be supplied by a passive power source, such as a capacitive element, to meet the peak power demand. A suitable power supply circuit is disclosed in U.S. patent application Ser. No. 10/872,040, filed on Jun. 18, 2004, the contents of which are incorporated by reference.

In normal operation, the converter 109 satisfies the amplifier's appetite for current by itself. When the amplifier 106 requires more current than the converter 109 can provide, it draws the deficit from a capacitance 110 that is connected in parallel with the output of the converter 109. Since large currents are required only for relatively brief periods, the charge stored in the capacitance 110 is sufficient to meet the requirements of the amplifier 106. Since, as shown in FIG. 18, the demands for large current are separated by relatively long periods, the converter 109 can recharge the capacitance 110.

The particular numerical values associated with the components shown in FIG. 19 will depend on the details associated with each application. Such details include the mean current draw, the maximum current draw, the mean time between demands for large current draws, the operating voltage range of the amplifier 106, the converter's saturation current and the parasitic resistance associated with the whatever arrangement of capacitors or other energy storage elements that are used to form the capacitance 110.

The capacitance 110 need not be provided by a single capacitor. In some cases, it may be more economical to assemble capacitors into a circuit having an appropriate equivalent capacitance 110 and the ability to operate across the required voltage drop. For example, the circuit may include many capacitors in series, with each capacitor having a rated voltage that is smaller than the power supply voltage applied to amplifier 106. In one embodiment, 62 capacitors, each having a capacitance of 17.3 farads and being rated to operate across a 2.5 voltage drop, are placed in series to form the required capacitance.

Should a malfunction or instability occur, the force exerted by the actuator can have a tendency to grow very large and to stay large for long periods of time. The power needed to maintain such a large force for long periods drains the capacitance 110 and causes the voltage to the amplifier 106 to "droop." This causes the amplifier 106 to disable itself. As a result, during instabilities, the power supply 107 imposes a power limitation that is low enough so that excess heat can be dissipated quickly, thereby avoiding thermal damage to the amplifier 106. In this way, the illustrated power supply 107 limits the power consumption of the actuator should a malfunction or instability occur. In one embodiment, the capacitors are chosen such that the stored energy can be dissipated to disable the amplifier within 55 milliseconds should a malfunction or instability occur.

In those embodiments in which the plant includes a seat, a difficulty can arise because of the presence of a seat cushion. As described above, an accelerometer and a position sensor are mounted on the seat. Therefore, the accelerometer and the position sensor sense the motion experienced by the seat. The assumption in this case is that a passenger sitting on that seat will experience the identical motion as the seat. However, in most cases, the passenger does not sit directly on a seat. Instead, the passenger sits on a seat cushion. The cushion amounts to an additional passive suspension element with its own transfer function.

In practice, the seat cushion introduces a transfer function having two zeros. These zeros reduce the gain of the acceleration loop and thereby reduce the control system's ability to suppress vibration at the frequencies corresponding to those zeros.

To address this difficulty, the frequencies associated with the two zeros are made to exceed the bandwidth of the acceleration loop controller 58. This can be achieved by increasing the effective stiffness of the springs within the cushion, for example by placing the cushion on a rigid backing.

The inputs and outputs of the various modules of the control system 48 have thus far been viewed as scalars. This is because for many seat mounts, the force required to suppress vibration along one axis is largely independent of the force required to suppress vibration along another axis. In such cases, the plant 16 can be characterized by a matrix transfer function that is essentially diagonal, with very small off-diagonal components. The acceleration loop transfer function and the position loop transfer function can also be characterized as essentially diagonal matrices. Under these circumstances, it is appropriate to consider the suppression of vibration along one axis independently of the suppression of vibration along another axis.

However, for certain types of seat mounts, a force applied to suppress vibration along one axis may affect a simultaneous attempt to suppress motion along a different axis. When this is the case, the plant transfer function can no longer be viewed as a diagonal matrix.

Figure 20:
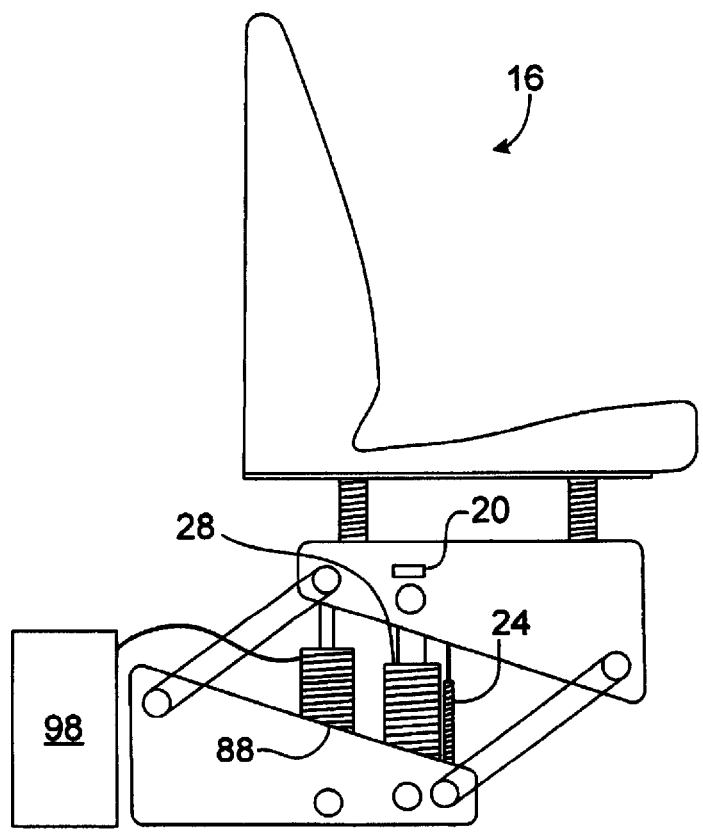
FIG. 20 shows a support for a seat that results in coupling between motion along different axes.

For example, FIG. 20 shows a plant 16 that includes a seat supported by a four bar linkage. It is apparent that an upward motion of the seat also results in an after-ward motion, with the relationship between the two being dependent on the vertical position of the seat.

Figure 21:
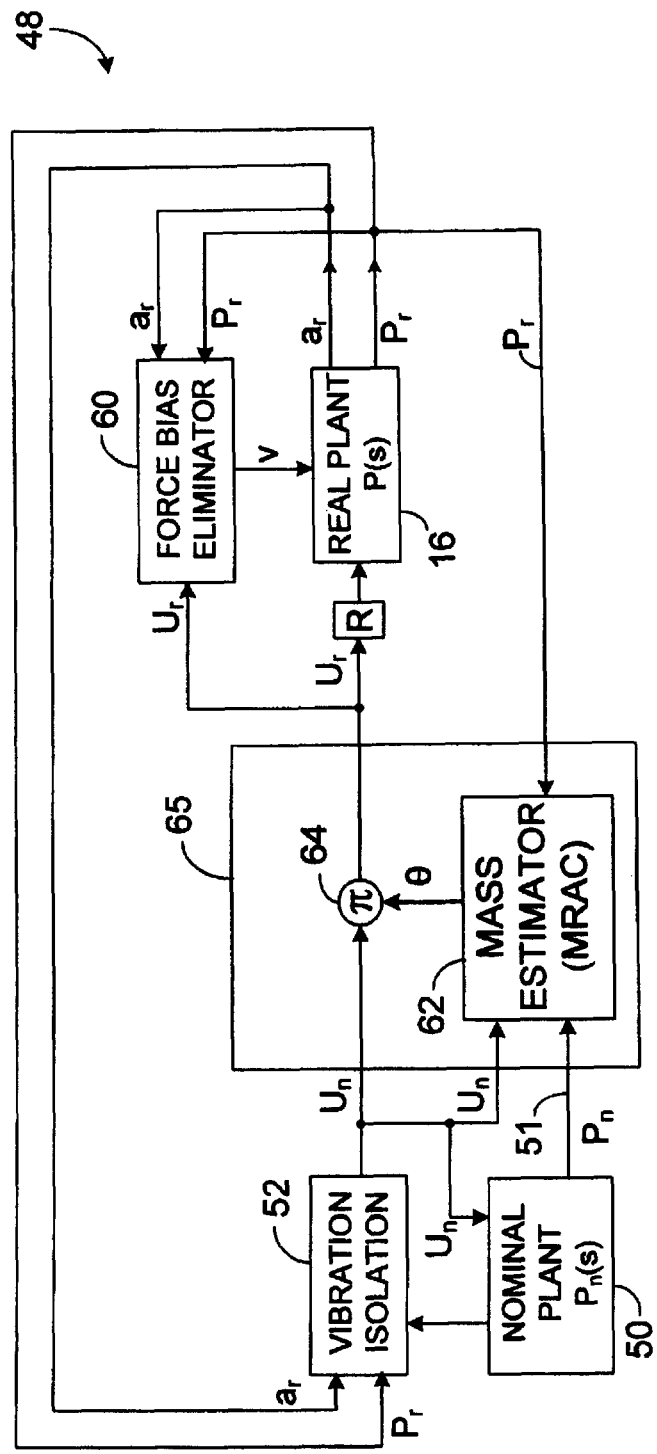
FIG. 21 shows a control system modified to accommodate coupling of motion along different axes.

In FIG. 21 the inputs and outputs for the various blocks are two-dimensional vectors. Thus, the control signal to be provided to the real plant 16 includes components for controlling two different force actuators. Before being applied to the real plant 16, the control signal is passed to a decoupling similarity transformation matrix R. Details of the procedure can be found in section 3.3 "vector spaces," of "Control System Handbook," published by IEEE press.

For the case shown in FIG. 20, in which the coupling is purely kinematic, a similarity transformation is used to decouple the kinematically-cross-coupled plant. In this case, the elements of the decoupling matrix are real-valued constants. The values of those elements can be derived directly from considering the geometry of the support.

In other cases, the coupling between motion in two directions includes a dynamic, as well as a kinematic component. In such cases, the elements of the decoupling matrix are complex-valued functions of frequency. In general, such matrices may not yield low-order realizable transfer-function matrices suitable for controller implementation.

Another approach to suppressing vibration of a plant in two directions is to use a fully populated controller matrix rather than a diagonal matrix for the acceleration loop controller. In this case, the elements of the acceleration loop controller matrix are computed such that the closed loop matrix transfer function associated with the acceleration loop is either diagonal or has negligible off-diagonal elements.

Other implementations are within the scope of the following claims:

1. An apparatus for controlling an actively suspended plant comprising:
    an electromagnetic actuator coupled to the plant;
    a sensor for providing information indicative of a state of the plant,
    a controller for receiving the information indicative of the state of the plant and outputting a signal to the electromagnetic actuator to cause the electromagnetic actuator to exert a force on the suspended plant, the controller provided with a fail-safe system controlled by a failure detector, and
    a selectively actuated damper separate from the electromagnetic actuator and coupled to the plant,
    wherein, under normal circumstances the damper is deactivated and generates little or no damping force, and when the failure detector determines that the plant is in an abnormal state, the fail safe system is caused to actuate the selectively actuated damper such that the selectively actuated damper provides a damping force that resists motion of the plant.

2. The apparatus of claim 1, wherein the abnormal state is indicated by a sensor signal that is larger than a predetermined threshold.

3. The apparatus of claim 2, wherein the sensor is an accelerometer and the predetermined threshold is a predetermined acceleration threshold.

4. The apparatus of claim 1, wherein the abnormal state is indicated by a failure of the sensor to provide information indicative of the state of the plant.

5. The apparatus of claim 1, wherein the abnormal state is indicated by an inconsistency between the sensor output and the physical constraints of the plant.

6. An apparatus for controlling an actively suspended plant comprising:
    an active suspension system comprising:
    an electromagnetic actuator coupled to the plant;
    a power amplifier for providing current to the electromagnetic actuator;
    a power supply;
    a sensor for providing information indicative of a state of the plant,
    an apparatus for providing information indicative of a state of a component of the active suspension system,
    a controller for receiving the information indicative of the state of the plant and outputting a signal to the power amplifier to provide a current to the electromagnetic actuator to cause the electromagnetic actuator to exert a force on the suspended plant, the controller provided with a fail-safe system controlled by a failure detector, and
    a selectively actuated damper separate from the electromagnetic actuator and coupled to the plant,
    wherein when the failure detector determines that either the plant is in an abnormal state or a component of the active suspension system is in an abnormal state, the fail safe system is caused to actuate the selectively actuated damper such that the selectively actuated damper provides a damping force that resists motion of the plant.

7. The apparatus of claim 6, wherein the component of the active suspension system is the sensor.

8. The apparatus of claim 6, wherein the component of the active suspension system is the power supply.

9. The apparatus of claim 6, wherein the component of the active suspension system is the power amplifier.

10. The apparatus of claim 6, wherein the component of the active suspension system is the electromagnetic actuator.

11. The apparatus of claim 6, wherein the component of the active suspension system is the controller.

12. The apparatus of claim 6 wherein the active suspension further comprises a force bias eliminator having the characteristic of a spring with variable spring constant.

13. The apparatus of claim 12 wherein the component of the active suspension system is the force bias eliminator.

* * * * *